(12) United States Patent
Weder (10) Patent No.: US 6,625,928 B2
(45) Date of Patent: Sep. 30, 2003

(54) DECORATIVE GROWER'S CONTAINERS AND METHODS FOR USING SAME

(75) Inventor: Donald E. Weder, Highland, IL (US)

(73) Assignee: Southpac Trust International, Inc., Highland, IL (US)

( * ) Notice: Subject to any disclaimer, the term of this patent is extended or adjusted under 35 U.S.C. 154(b) by 0 days.

(21) Appl. No.: 10/036,888

(22) Filed: Jan. 2, 2002

(65) Prior Publication Data

US 2003/0019154 A1 Jan. 30, 2003

Related U.S. Application Data

(63) Continuation-in-part of application No. 09/916,886, filed on Jul. 27, 2001.

(51) Int. Cl.[7] ............................................... A01G 9/02
(52) U.S. Cl. ....................................................... 47/66.7
(58) Field of Search .............................. 47/72, 73, 65.5, 47/65.6, 66.6, 66.7, 77, 84, 48.5

(56) References Cited

U.S. PATENT DOCUMENTS

| | | | | |
|---|---|---|---|---|
| 5,120 | A | * | 5/1847 | Snow .............................. 2/342 |
| D5,120 | S | | 7/1871 | Snow |
| D5,806 | S | | 4/1872 | Palmer |
| 726,766 | A | | 4/1903 | Schaefer |
| 758,678 | A | * | 5/1904 | Muller ........................... 47/73 |
| D44,563 | S | | 8/1913 | Haase |
| D46,645 | S | | 11/1914 | Traylor |
| 1,572,548 | A | | 2/1926 | Mattison |
| D136,358 | S | | 9/1943 | Grau |
| 2,355,559 | A | | 8/1944 | Renner |
| 2,774,187 | A | | 12/1956 | Smithers |
| 2,989,828 | A | | 6/1961 | Warp |
| 3,009,603 | A | | 11/1961 | Stockdale ..................... 47/65.5 |
| 3,058,263 | A | | 10/1962 | Reynolds |

(List continued on next page.)

FOREIGN PATENT DOCUMENTS

| | | | |
|---|---|---|---|
| AU | 103316 | | 6/1935 |
| AU | 9979 | | 2/1968 |
| AU | 42319 | | 6/1979 |
| CH | 686065 | A5 | 12/1995 |
| DE | 605657 | | 10/1934 |
| DE | 1003489 | | 2/1957 |
| EP | 18303 | | 4/1980 |
| FR | 785369 | | 8/1935 |
| FR | 2112753 | | 6/1972 |
| FR | 2610604 | | 8/1988 |
| GB | 158098 | | 1/1921 |
| GB | 735800 | | 8/1955 |
| GB | 891078 | | 3/1962 |
| JP | 2286013 | | 11/1990 |
| JP | 10-94331 | * | 4/1998 ............ A01G/9/02 |

OTHER PUBLICATIONS

Bonnie Plant Farm, pot and affidavit.*
PENpages, Care and Handling of Potted Plants, May 6, 1999, www.penpages.psu.edu/penpages_reference/29401/2940140.html.*
Sunset Books, "Plant Containers You Can Make", PP. 40–41 & 42–43, Date Mar. 1976.

Primary Examiner—Charles T. Jordan
Assistant Examiner—Francis T. Palo
(74) Attorney, Agent, or Firm—Dunlap, Codding & Rogers, P.C.

(57) ABSTRACT

Methods and apparatus are provided for growing a plant in a grower's container having an aesthetically pleasing appearance without the use of a decorative container cover when a grown plant contained in the grower's container is on display. The apparatus and method include providing a grower's container, cleaning at least a portion of the grower's container to provide a clean area on which a decorative sticker is applied, disposing growing medium and a floral grouping in the floral grouping retaining space of the decorative grower's container, feeding and watering the floral grouping until it matures to a size desired for marketing, and the decorative grower's container so that the decorative pattern disposed thereon is visible when on display.

30 Claims, 7 Drawing Sheets

U.S. PATENT DOCUMENTS

| | | |
|---|---|---|
| 3,094,810 A | 6/1963 | Kalpin |
| 3,869,828 A | 3/1975 | Matsumoto ................. 47/34.11 |
| 3,961,444 A | 6/1976 | Skaife ....................... 47/34.11 |
| 3,962,503 A | 6/1976 | Crawford ..................... 428/40 |
| D242,736 S | 12/1976 | Craft, III et al. .......... D11/143 |
| 4,043,077 A | 8/1977 | Stonehocker ................... 47/66 |
| 4,138,803 A * | 2/1979 | Sherlock ....................... 47/67 |
| 4,142,324 A | 3/1979 | Magyar, Jr. .................... 47/75 |
| D254,194 S | 2/1980 | Smith ........................ D11/152 |
| D254,659 S | 4/1980 | Karotseris ................. D11/143 |
| D255,409 S | 6/1980 | Volkmann et al. ........... D6/182 |
| 4,400,910 A | 8/1983 | Koudstaal et al. ............. 47/84 |
| 4,413,725 A | 11/1983 | Bruno et al. .............. 206/45.33 |
| 4,435,918 A | 3/1984 | Shain .......................... 47/79 |
| 4,457,104 A | 7/1984 | Hefner ......................... 47/73 |
| 4,739,581 A | 4/1988 | Jarvis ........................... 47/66 |
| D295,842 S | 5/1988 | Gay .......................... D11/152 |
| 4,801,014 A | 1/1989 | Meadows ................... 206/423 |
| 5,042,197 A | 8/1991 | Pope ............................. 47/79 |
| 5,239,775 A | 8/1993 | Landau ......................... 47/72 |
| D340,882 S | 11/1993 | Holtkamp, Jr. ............ D11/164 |
| 5,363,592 A * | 11/1994 | Weder et al. ................ 47/66.7 |
| 5,490,352 A | 2/1996 | Weder et al. .................. 47/58 |
| 5,526,932 A * | 6/1996 | Weder ........................... 47/72 |
| 5,605,012 A | 2/1997 | Weder et al. .................. 47/64 |
| 5,634,558 A | 6/1997 | Weder |
| 5,706,605 A | 1/1998 | Alcazar et al. ............. 47/65.7 |
| 6,003,267 A * | 12/1999 | Weder ........................... 47/72 |
| 6,085,460 A * | 7/2000 | Jackson ..................... 47/65.5 |
| 6,199,319 B1 * | 3/2001 | Skinner ..................... 47/66.6 |

\* cited by examiner

DECORATIVE GROWER'S CONTAINERS AND METHODS FOR USING SAME

CROSS REFERENCE TO RELATED APPLICATIONS

This application is a continuation-in-part of U.S. Ser. No. 09/916,886 filed Jul. 27, 2001.

STATEMENT REGARDING FEDERALLY SPONSORED RESEARCH OR DEVELOPMENT

Not applicable.

BACKGROUND OF THE INVENTION

1. Field of the Invention

The present invention relates generally to containers in which a plant is grown and methods for using same, and more particularly, but not by way of limitation, to containers used by a grower of a plant having a decorative pattern thereon and methods of using same.

2. Brief Description of the Prior Art

Various types of containers, both with and without apertures for drainage and irrigation of the growing medium disposed therein, have been used for many years by growers of botanical items. The containers serve the purpose of growing the botanical items, but upon shipment to retail florists or other distributors, the container is typically covered with a decorative cover or sleeve to hide the unattractive container, or the botanical item is transplanted into a more attractive container.

Although the prior art methods of covering the container in which the botanical item is grown or transplanting the botanical item into a more attractive container have been widely accepted, new and improved methods for growing botanical items in a more attractive container which provides for controllable drainage and irrigation are being sought. These methods would eliminate both time and the expense of the cover or second container. It is to such decorative grower's containers and methods for using same that the present invention is directed.

SUMMARY

According to the present invention, a decorative container is provided for use by a grower of plants and flowers to hold a growing medium and grow the plants or flowers. Broadly, the decorative grower's container is provided with a sidewall having an outer peripheral surface and at least one drain hole extending through the sidewall, a sticker to seal the drain hole and a floral grouping retaining space adapted to receive growing medium and a botanical item or propagule. To provide the decor to the decorative grower's container, a decorative pattern is applied to at least a portion of the outer peripheral surface of the sidewall of the grower's container. The decorative pattern may be applied to at least a portion of the outer peripheral surface of the sidewall of the grower's container either before the growing medium and botanical item or propagule are disposed in the floral grouping retaining space of the grower's container, after the growing medium and botanical item or propagule are disposed in the floral grouping retaining space of the grower's container, or after the botanical item or propagule has grown to a desired size for marketing but prior to shipment to wholesale or retail distribution points. At least a portion of the outer peripheral surface of the sidewall of the grower's container will be cleaned prior to the application of the decorative pattern or prior to marketing.

An object of the present invention is to provide a decorative grower's container.

Another object of the present invention, while achieving the before-stated object, is to provide methods for using a decorative grower's container by a grower of a botanical item or propagule.

Other objects, features and advantages of the present invention will become apparent from the following detailed description when read in conjunction with the accompanying drawings and appended claims.

DESCRIPTION OF THE PREFERRED EMBODIMENTS

Shown in FIGS. 1–7 and designated therein by the general reference numeral 10 is a grower's container. The grower's container 10 is provided with an open upper end 12, a closed lower end 14, and a sidewall 16. The sidewall 16 has an outer peripheral surface 20. The closed lower end 14 and the sidewall 16 of the grower's container 10 cooperate to define a floral grouping retaining space 22, which is in open communication with the open upper end 12 of the grower's container 10. The floral grouping retaining space 22 of the grower's container 10 is adapted to receive a growing medium and a floral grouping so that the floral grouping can be grown in the floral grouping retaining space 22 of the grower's container 10.

Figure 1:
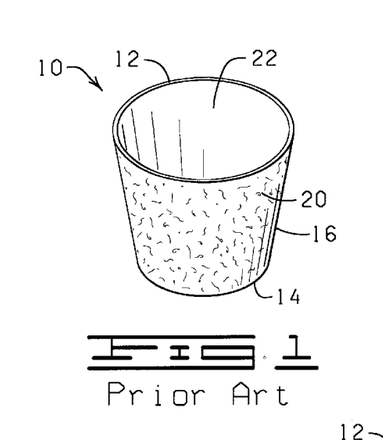
FIG. 1 is a perspective view illustrating a typical prior art grower's container.

Containers suitable for use as the grower's container 10 are well known in the art. Such a grower's container 10 is constructed from a material which may be polymeric material, sandstone, clay, ceramic, porcelain, plaster, marble, glass, or any other suitable material or any other material constructed to be used by growers for such purposes. The thickness of the material from which the grower's container 10 is constructed can vary widely, and the material may be flexible or inflexible, as long as the material is substantially shape-sustaining and can maintain a floral grouping and growing medium disposed within the floral grouping retaining space 22 of the grower's container 10. Generally, however, the thickness of the material from which the grower's container 10 is constructed is in the range of from about 1.0 mil to about 50 mils. The term "container" may be used interchangeably herein with the term "pot".

Figure 2:
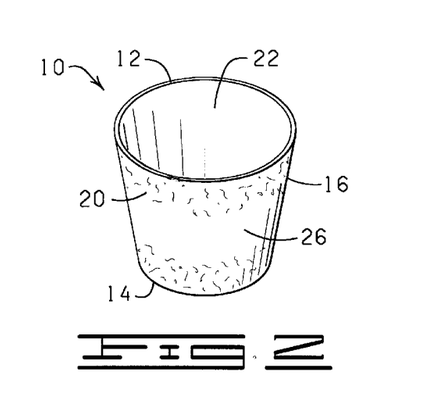
FIG. 2 is a perspective view illustrating the grower's container of FIG. 1 having a portion of an outer peripheral surface of a sidewall cleaned.

At least a portion of the outer peripheral surface 20 of the sidewall 16 of the grower's container 10 is cleaned to provide a clean area 26 on at least a portion of the outer peripheral surface 20 of the sidewall 16 of the grower's container 10, as shown in FIG. 2. The grower's container 10 may be cleaned by methods well known in the art, such as, but not by way of limitation, with water, soap and/or detergent.

Figure 3:
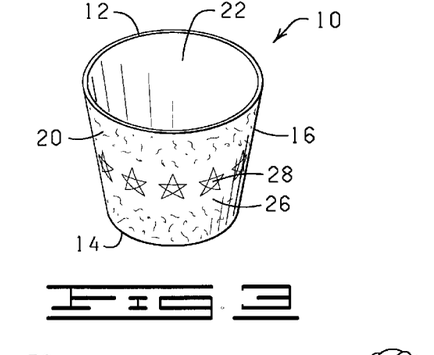
FIG. 3 is a perspective view illustrating the grower's container of FIG. 2 having a decorative pattern applied to the outer peripheral surface of the sidewall in accordance with the present invention.

As shown in FIG. 3, a decorative pattern 28 is then applied to the clean area 26 of the outer peripheral surface 20 of the sidewall 16 of the grower's container 10. The decorative pattern 28 provides the grower's container 10 with an aesthetically pleasing appearance.

The decorative pattern 28 may be applied to the outer peripheral surface 20 of the sidewall 16 of the grower's container 10 by several methods, including, but not limited to, painting, stenciling, texturing, printing, embossing, silk screening, applying decorative stickers, and applying adhesive decorations. Application methods such as painting, stenciling and printing may require an ink or dye to provide the decorative pattern 28. An example of an ink which may be applied to the outer peripheral surface 20 of the sidewall 16 of the grower's container 10 is described in U.S. Pat. No. 5,147,706, entitled, "Water Based Ink On Foil And/Or Synthetic Organic Polymer", issued to Kingman on Sep. 15, 1991, and which is hereby incorporated herein by reference. Alternatively, methods such as texturing and embossing may require depressions and impressions to be imprinted on the outer peripheral surface 20 of the sidewall 16 of the grower's container 10. Additionally, application methods involving silk screening, stickers and adhesive decorations may require a bonding material to be present on the decoration, the container or both.

Each of the application methods may occur singly, that is, the outer peripheral surface 20 of the sidewall 16 of the grower's container 10 may be textured only or printed only, and the application methods may occur in any combination, that is, the outer peripheral surface 20 of the sidewall 16 of the grower's container 10 may be both printed and embossed. The combination of applications to enhance the decorative pattern 28 may be accomplished by applying the patterns either in register with one another, out of register with one another, or partially in register and partially out of register with one another. That is, the boundaries of the printed pattern can align with the boundaries of the embossed pattern or the boundaries of the printed pattern can be out of alignment with the boundaries of the embossed pattern. The applications may be present on a portion of the outer peripheral surface 20 or on the entire outer peripheral surface 20 of the sidewall 16 of the grower's container 10.

Figure 4:
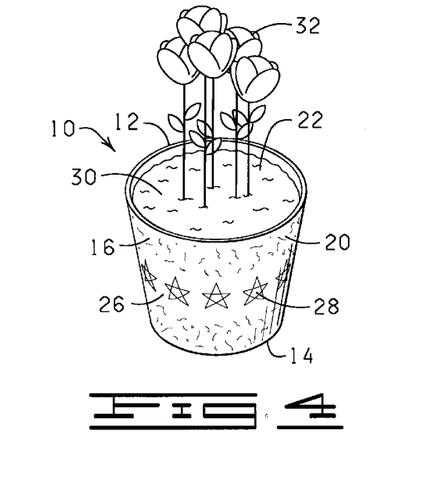
FIG. 4 is a perspective view illustrating the decorative grower's container of FIG. 3 having growing medium and a floral grouping disposed within a floral grouping retaining space of the grower's container.
Figure 5:
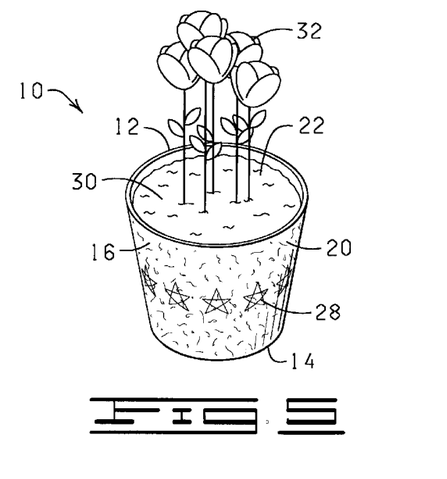
FIG. 5 is a perspective view illustrating the decorative grower's container of FIG. 4 having an outer peripheral surface of the sidewall of the decorative grower's container soiled to distort the decorative pattern applied thereto.
Figure 6:
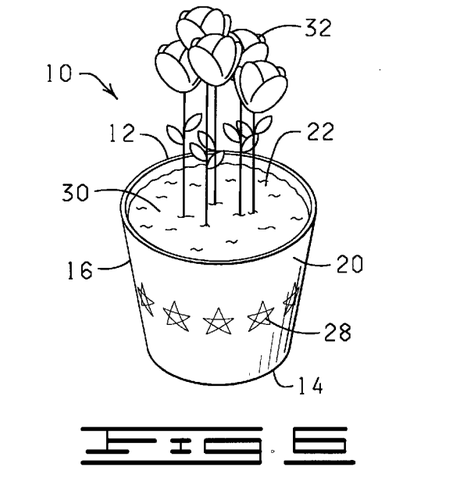
FIG. 6 is a perspective view illustrating the decorative grower's container of FIG. 5 having growing medium and a floral grouping disposed within the floral grouping retaining space of the decorative grower's container and having at least a portion of the outer peripheral surface of the sidewall of the decorative grower's container cleaned to display the decorative pattern applied thereon.
Figure 7:
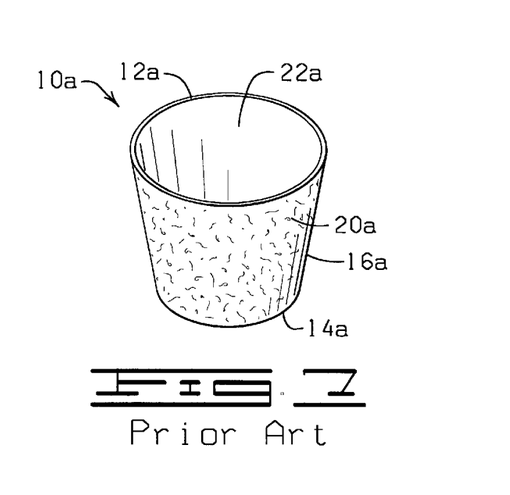
FIG. 7 is a perspective view illustrating a typical prior art grower's container.
Figure 8:
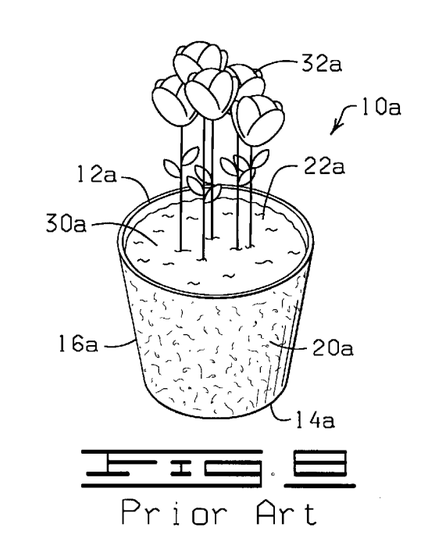
FIG. 8 is a perspective view illustrating the grower's container of FIG. 7 having growing medium and a floral grouping disposed within the floral grouping retaining space of the grower's container, an outer peripheral surface of a sidewall of the grower's container being soiled.
Figure 9:
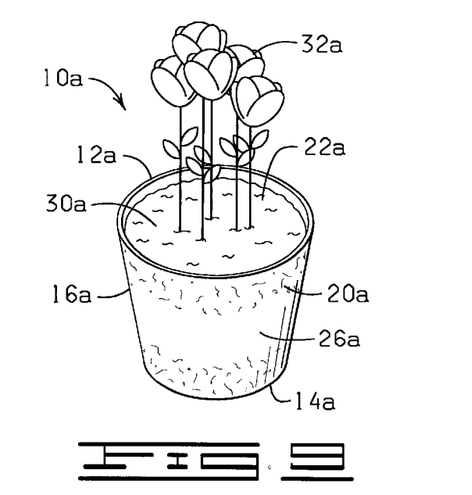
FIG. 9 is a perspective view illustrating the grower's container of FIG. 8 having a portion of the outer peripheral surface of the sidewall cleaned.

As shown in FIG. 4, a growing medium 30 and a floral grouping 32 are disposed in the floral grouping retaining space 22 of the grower's container 10 after application of the decorative pattern 28 to the outer peripheral surface 20 of the sidewall 16 of the grower's container 10. Subsequently, the floral grouping 32 may be fed and watered until the floral grouping 32 has matured to a size desired for marketing. The processes of disposing the growing medium 30 and the floral grouping 32 in the grower's container 10, as well as feeding and watering the floral grouping 32, may soil the outer peripheral surface 20 of the sidewall 16 of the grower's container 10 containing the decorative pattern 28, as shown in FIG. 5, and therefore the outer peripheral surface 20 of the sidewall 16 of the grower's container 10 is then cleaned so that the decorative pattern 28 on at least a portion of the outer peripheral surface 20 of the sidewall 16 of the grower's container 10 is visible when the matured floral grouping 32 contained in the grower's container 10 is on display (FIG. 6).

The term "floral grouping" may be used interchangeably herein with the terms "plant" and/or "flower". The term "floral grouping" may also be used interchangeably herein with the terms "botanical item" and/or "propagule".

The term "botanical item" when used herein means a natural herbaceous or woody plant, taken singly or in combination. The term "botanical item" also means any portion or portions of natural herbaceous or woody plants including stems, leaves, flowers, blossoms, buds, blooms, cones, or roots, taken singly or in combination, or in groupings of such portions such as a bouquet or floral grouping.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

Figure 10:
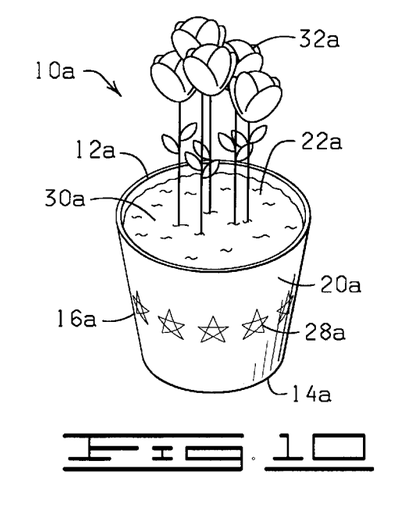
FIG. 10 is a perspective view illustrating the decorative grower's container of FIG. 9 having a decorative pattern applied to the clean area of the outer peripheral surface of the sidewall of the decorative grower's container in accordance with the present invention.

Now it will be understood that the order of the steps in the method as described herein may vary. For example, another method of use of the present invention is illustrated by FIGS. 7–10. A grower's container 10a illustrated in FIG. 7 and used in this method is constructed exactly the same as the grower's container 10 shown in FIG. 1, and is provided with an open upper end 12a, a closed lower end 14a, a sidewall 16a having an outer peripheral surface 20a, and a floral grouping retaining space 22a, and is constructed of the same material as the decorative grower's container 10. Growing medium 30a and a floral grouping 32a are then disposed in the retaining space 22a of the grower's container 10a (FIG. 8) and the floral grouping 32a is fed, watered and allowed to mature to a marketable size. Next, a portion of the outer peripheral surface 20a of the sidewall 16a of the grower's container 10a is cleaned (FIG. 9) to provide a clean area 26a on a portion of the outer peripheral surface 20a of the sidewall 16a of the grower's container 10a, and a decorative pattern 28a is applied to at least a portion of the clean area 26a on the outer peripheral surface 20a of the sidewall 16a of the grower's container 10a (FIG. 10).

Figure 11:
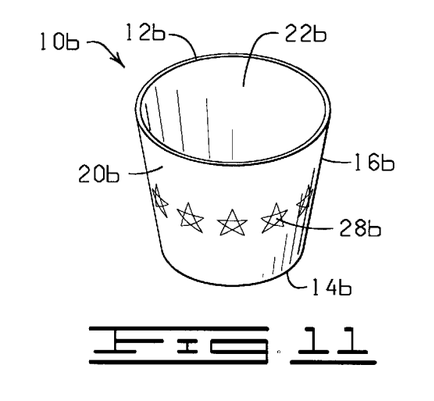
FIG. 11 is a perspective view illustrating a decorative grower's container constructed in accordance with the present invention.
Figure 12:
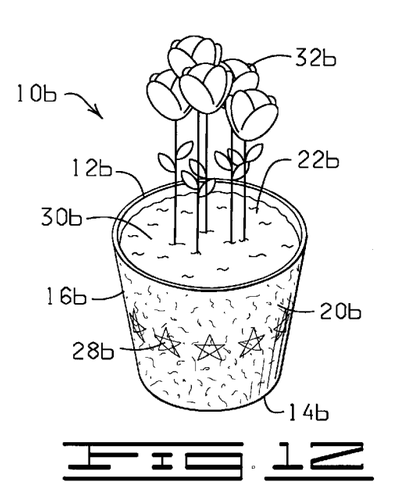
FIG. 12 is a perspective view illustrating the decorative grower's container of FIG. 11 having growing medium and a floral grouping disposed within a floral grouping retaining space of the decorative grower's container and having an outer peripheral surface of a sidewall of the decorative grower's container soiled to distort the decorative pattern applied thereto.
Figure 13:
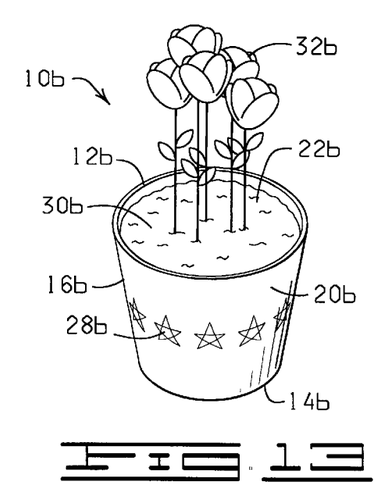
FIG. 13 is a perspective view illustrating the decorative grower's container of FIG. 12 having growing medium and a floral grouping disposed within the floral grouping retaining space of the decorative grower's container and having a portion of the outer peripheral surface of the sidewall of the decorative grower's container cleaned to display the decorative pattern applied thereon.

In another method of use illustrated by FIGS. 11–13, a decorative grower's container 10b is provided to the grower. The decorative grower's container 10b (FIG. 11) includes an open upper end 12b, a closed lower end 14b, and a sidewall 16b having an outer peripheral surface 20b. The closed lower end 14b and the sidewall 16b of the decorative grower's container 10b cooperate to define a floral grouping retaining space 22b, which is in open communication with the open upper end 12b of the decorative grower's container 10b. The decorative grower's container 10b is constructed of the same material as the decorative grower's container 10. The decorative grower's container 10b is also provided with a decorative pattern 28b applied to at least a portion of the outer peripheral surface 20b of the sidewall 16b of the decorative grower's container 10b. Growing medium 30b and a floral grouping 32b are disposed in the floral grouping retaining space 22b of the decorative grower's container 10b, as illustrated in FIG. 12, and the floral grouping 32b may be fed and watered until the floral grouping 32b has matured to a size desired for marketing. The processes of disposing the growing medium 30b and the floral grouping 32b in the decorative grower's container 10b, as well as feeding and watering the floral grouping 32b, may soil the outer peripheral surface 20b of the sidewall 16b of the decorative grower's container 10b containing the decorative pattern 28b, as shown in FIG. 12, and therefore the outer peripheral surface 20b of the sidewall 16b of the decorative grower's container 10b is then cleaned so that the decorative pattern 28b on at least a portion of the outer peripheral surface 20b of the sidewall 16b of the decorative grower's container 10b is visible when the matured floral grouping 32b contained in the decorative grower's container 10b is on display (FIG. 13).

In yet another method of use, a floral grouping 32b may be replanted by a grower in a decorative grower's container 10b as shown in FIG. 13 prior to sale of the floral grouping 32b by the grower. The decorative grower's container 10b used in this method is constructed exactly the same as the grower's container 10b shown in FIG. 11 and described in detail previously.

Figure 14:
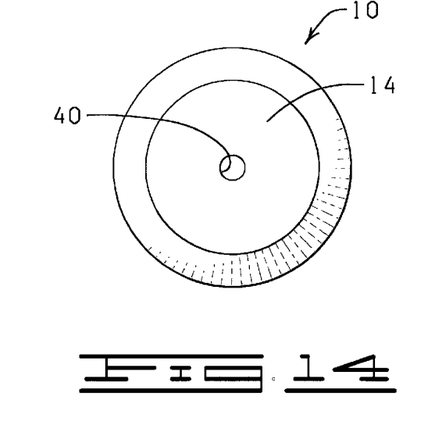
FIG. 14 is a bottom plan view illustrating the decorative grower's container of FIG. 11 wherein the grower's container is provided with a drain hole in a lower end thereof.

As shown in FIG. 14, the closed lower end 14 of the grower's container 10 may be provided with a drain hole 40 extending there through. The drain hole 40 provides drainage and irrigation to the floral grouping retaining space 22 of the grower's container 10. The drain hole 40 is sized to prevent the loss of substantial amounts of growing medium 30, as well as the floral grouping 32 when growing medium 30 and the floral grouping 32 are disposed in the floral grouping retaining space 22 of the grower's container 10. The drain hole 40 may be located in the center of the closed lower end 14 of the grower's container 10, or it may be located peripherally and substantially close to the connection of the sidewall 16 to the closed lower end 14 of the grower's container 10.

Figure 15:
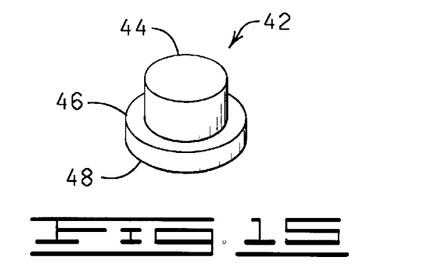
FIG. 15 is a diagrammatic illustration of a stopper for closing off the drain hole in the lower end of the decorative grower's container of FIG. 14.
Figure 16:
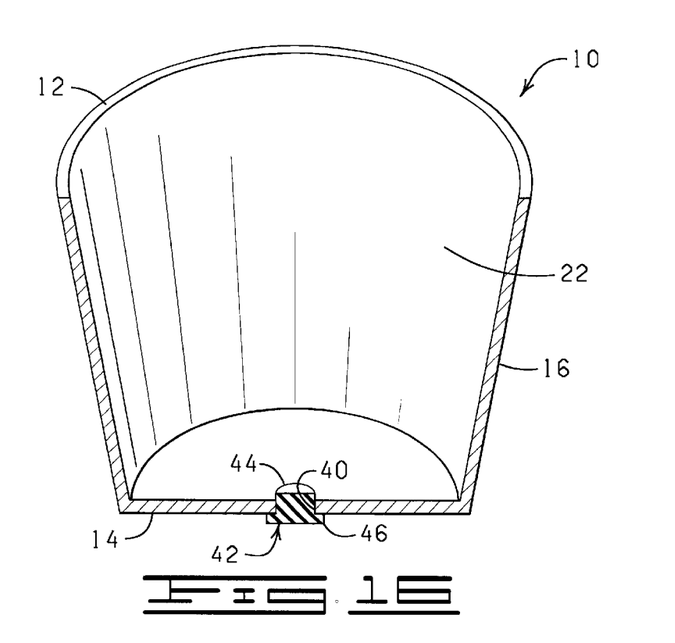
FIG. 16 is a cross sectional view of the decorative grower's container of FIG. 14 having the stopper of FIG. 15 disposed in the drain hole in the lower end of the decorative grower's container.

As shown in FIGS. 15 and 16, a stopper 42 may also be provided with the grower's container 10 to close the drain hole 40 in the closed lower end 14 of the grower's container 10 when drainage and irrigation of the floral grouping retaining space 22 is not required. As shown in FIG. 15, the stopper 42 is provided with a plug member 44 adapted to be inserted into the drain hole 40, so that upon insertion of the stopper 42 into the drain hole 40, fluid will not be able to drain from the floral grouping retaining space 22 through the drain hole 40 of the grower's container 10.

The stopper 42 will be constructed of a fluid impermeable and slightly flexible but substantially shape-sustaining material such as, but not by way of limitation, rubber. The stopper 42 will also be provided with an outwardly extending flange 46 on a lower end 48 thereof, as shown in FIG. 15, and the flange 46 of the stopper 42 will allow for easy removal of the stopper 42 from the drain hole 40 of the grower's container 10. The flange 46 on the lower end 48 of the stopper 42 will be of such a size as to maintain the grower's container 10 in a steady, upright position.

It will be understood that the stopper 42 may be disposed in the drain hole 40 prior to or after any of the steps in the several methods described herein. The stopper 42 may also be removed from the drain hole 40 prior to or after any of the steps in the several methods described herein.

For the sake of brevity, the drain hole 40 and the stopper 42 described hereinbefore were only discussed in relation to the grower's container 10. However, it will be understood that any embodiments of the decorative grower's container 10 contained herein, including the decorative grower's containers 10, 10a and 10b, will also be provided with a drain hole 40 and a stopper 42.

Figure 17:
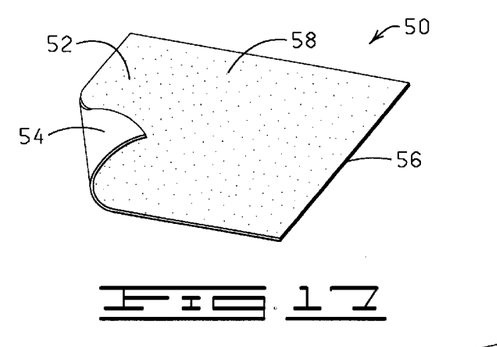
FIG. 17 is a perspective view of a sticker with one corner thereof turned upwardly.
Figure 18:
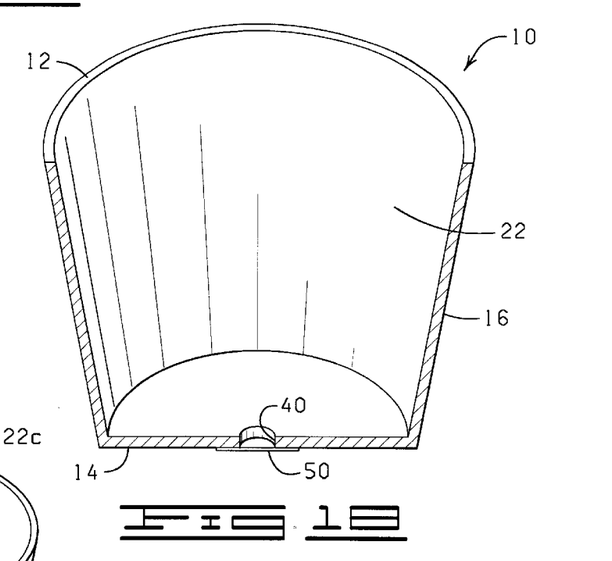
FIG. 18 is a cross sectional view of the decorative grower's container of FIG. 14 having the sticker of FIG. 17 disposed over the drain hole in the lower end of the decorative grower's container.

Referring now to FIG. 17 shown therein is a sticker 50 constructed, in accordance with the present invention. The sticker 50 is utilized for sealing the drain hole 40 in the decorative grower's container 10 as shown in FIG. 18.

The sticker 50 has an upper surface 52, a lower surface 54, and an outer perimeter 56. The sticker 50 is also provided with a bonding material 58 disposed on the upper or lower surfaces 52 or 54 of the sticker 50. The bonding material 58 is adapted to adhere to the substantially closed lower end 14 of the grower's container 10, such that upon placement of the sticker 50 over the drain hole 40, fluid will not be able to drain from the drain hole 40 of the grower's container 10.

The sticker 50 is constructed from any fluid impermeable material suitable for use as a sticker, such as, by way of example but not limitation, treated paper, treated cloth, waxed paper, polymeric film, metal foil, plastic, vinyl or laminations and combinations thereof. The term "polymeric film" means a synthetic polymer such as a polypropylene or a naturally occurring polymer such as cellophane. A polymeric film is relatively strong and not as subject to tearing (substantially non-tearable), as might be the case with paper or foil.

The sticker 50 is sized, shaped and disposed such that the outer perimeter 56 of the sticker 50 extends completely over the drain hole 40 and entirely covers the drain hole 40 thereby providing a water resistant seal for the drain hole 40 over which the sticker 50 is disposed. The outer perimeter 56 of the sticker 50 can be any shape, such as round, oval, rectangular, square, star, hexagonal, fanciful or decorative so long as it is capable of functioning in the manner previously described. The outer perimeter 56 of the sticker 50 may or may not be the same configuration as the drain hole 40 over which the sticker 50 is disposed as long as the outer perimeter 56 of the sticker 50 extends beyond the drain hole 40 a sufficient distance so as to provide the water resistant seal around the drain hole 40.

Figure 19:
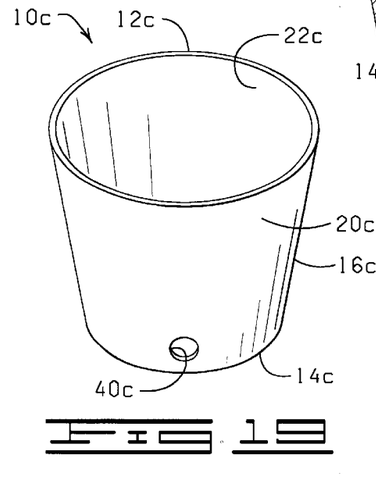
FIG. 19 is a perspective view of the decorative grower's container having a drain hole provided on a lower portion of an outer peripheral surface of a sidewall of the decorative grower's container.

Illustrated in FIG. 19 and designated therein by the general reference numeral 10c is another grower's container. The grower's container 10c is similar to the grower's containers 10, 10a, and 10b described hereinbefore. The grower's container 10c includes an open upper end 12c, a closed lower end 14c, a sidewall 16c, a retaining space 22c and at least one drain hole 40c. The grower's container 10c is constructed from the same type of material and of the same thickness of material as the previously described grower's containers. Containers suitable for use as a grower's container 10c are the same type of containers previously described as suitable for use as grower's containers. The only notable difference between the grower's container 10c and the previously described grower's containers 10, 10a, and 10b is that rather than the drain hole 40 being disposed in the closed lower end 14 of the grower's container 10, the drain hole 40c is disposed in the sidewall 16c of the grower's container 10c, preferably near the closed lower end 14c of the grower's container 10c.

The drain hole 40c may be sealed with the stopper 42 of FIG. 15 in a similar manner to that described for closing the drain hole 40 of the grower's container 10 illustrated in FIG. 16. The drain hole 40c can also be closed with the sticker 50 in a manner similar to that described for closing the drain hole 40c in the grower's container 10c as illustrated in FIG. 18.

Figure 20:
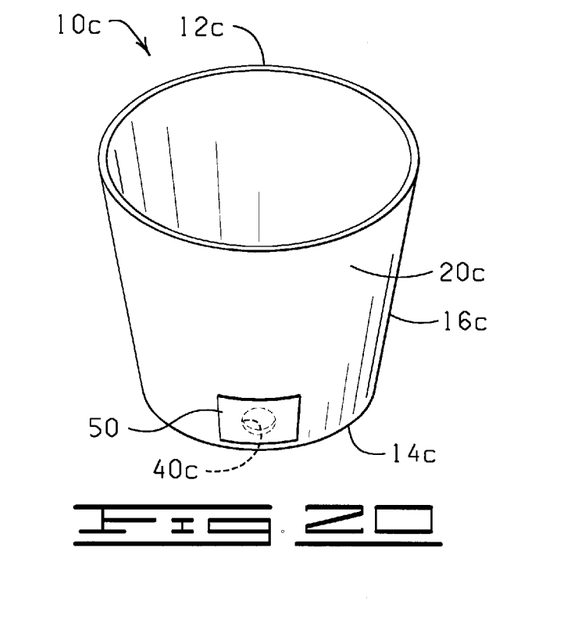
FIG. 20 is a perspective view illustrating the decorative grower's container of FIG. 19 having a sticker applied to the outer peripheral surface of the sidewall of the decorative grower's container to cover the drain hole therein.

FIG. 20 illustrates the sticker 50 of FIG. 17 disposed over the drain hole 40c of the grower's container 10c to close the drain hole 40c and control drainage and irrigation of the grower's container 10c. While the grower's container 10c is illustrated as having only one drain hole 40c it will be understood by those skilled in the art that the grower's container 10c can be provided with one or more drain holes 40c in either or both the sidewall 16c and the closed lower end 14c of the grower's container 10c.

Figure 21:
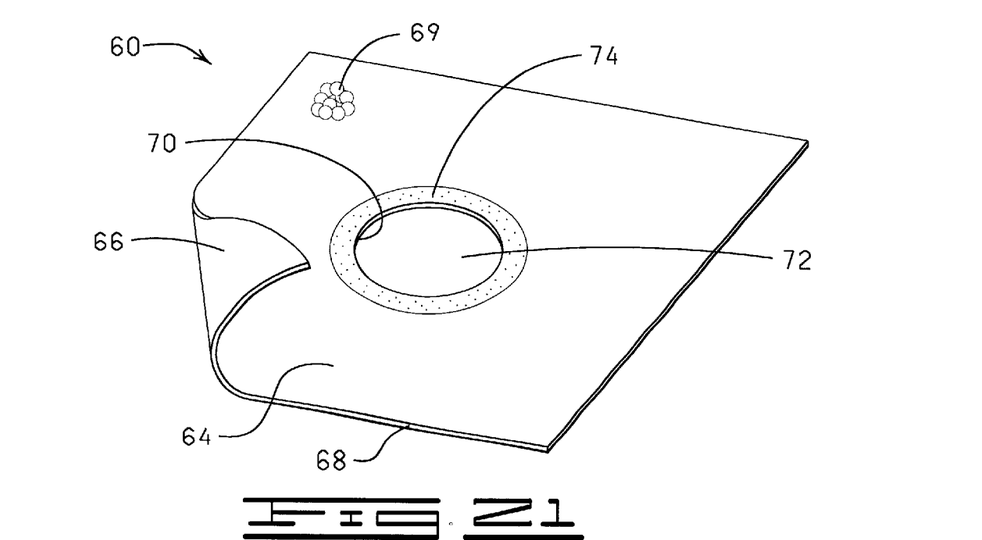
FIG. 21 is a perspective view of a sheet of material which is utilized in forming the decorative collar illustrated in FIG. 22.
Figure 22:
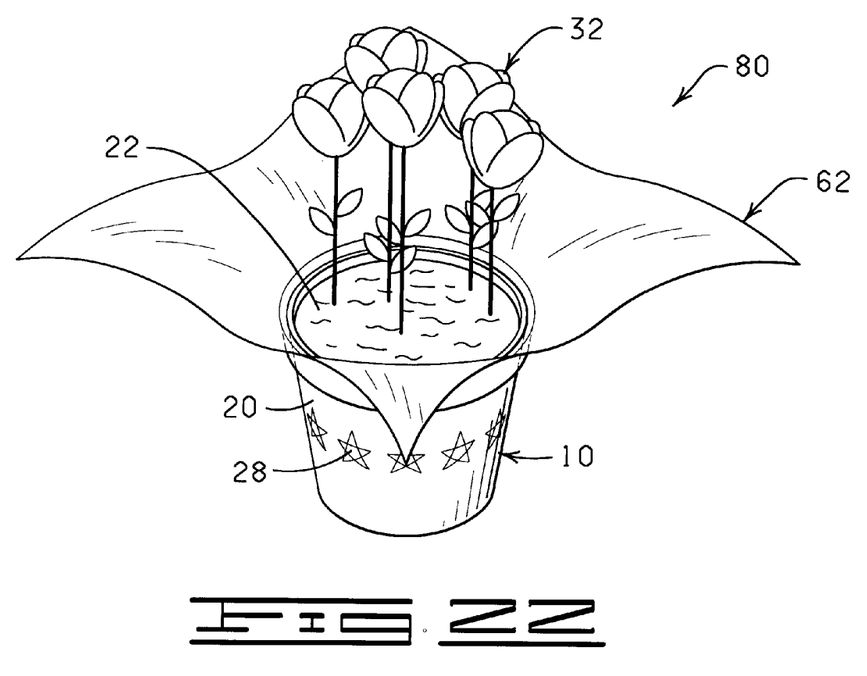
FIG. 22 is a perspective view illustrating the decorative grower's container of FIG. 19 having a decorative collar disposed around the open upper end of the decorative grower's container.

Referring now to FIG. 21 shown therein is a sheet of material 60 which is used to form a decorative collar 62 about the grower's container 10 as shown in FIG. 22. The sheet of material 60 has an inner surface 64, an outer surface 66, an outer edge 68 and an inner perimeter 70. The inner perimeter 70 of the sheet of material 60 defines an opening 72 through which the grower's container 10 is disposed. Preferably the opening 72 is formed through a central portion of the sheet of material 60, however, the opening 72 may be "off center". The inner perimeter 70 is preferably sized and shaped so as to approximate the shape and perimeter of the grower's container 10 near the open upper end 12 of the grower's container 10. The outer edge 68 of the sheet of material 60 can be of virtually any desired geometric form such as by way of example square, rectangular, circular, oval, octagonal, decorative or fanciful. The size of the sheet of material 60 can be of any desired size as long as the sheet of material 60 can function for its intended purpose. The sheet of material 60 can have printed or embossed material 69 on either the inner surface 64, the outer surface 66, or both the inner and the outer surfaces 64 and 66. In one embodiment, an area of bonding material 74 is disposed upon a portion of the inner surface 64 in a position generally surrounding the opening 72 and extending away from the opening 72 in a direction toward the outer edge 68 of the sheet of material 60. The area of bonding material 74 is shown as disposed in a circle about the opening 72 however, it will be understood that the bonding material may be disposed in a variety of arrangements, including, but not limited to, spots, checkerboard, dapples, or stripes.

The bonding material 74 is preferably a pressure sensitive adhesive or cohesive but may comprise other compositions. It will also be appreciated that the sheet of material 60 used in accordance with the present invention may comprise one or more areas of bonding material 74.

The sheet of material 60 used to form the decorative collar 62 can be transparent, translucent, tinted, colored, or devoid of color. The sheet of material 60 can be any thickness so long as the sheet of material 60 is formable about the outer peripheral surface 20 of the grower's container 10 and can be utilized for its intended purpose.

Referring now to FIG. 22 shown therein is a floral assembly 80 constructed in accordance with the present invention. The floral assembly 80 includes the decorative collar 62, the floral grouping 32, and the grower's container 10.

The floral assembly 80 is constructed by first providing the grower's container 10 having the decorative pattern 28, the floral grouping 32 and the sheet of material 60. The floral grouping 32 is disposed within the retaining space 22 of the grower's container 10. The sheet of material 60 is formed into the decorative collar 62 about the grower's container 10. In forming the decorative collar 62 about the grower's container 10, the grower's container 10 may be empty or may have the growing medium and/or plant, floral grouping 32, botanical item or propagule disposed therein.

In one method of forming the sheet of material 60 into the decorative collar 62 about the grower's container 10, the grower's container 10 is aligned with the opening 72 in the sheet of material 60 and is moved into the opening 72. A portion of the sheet of material 60 substantially near the opening 72 engages the outer peripheral surface 20 of the grower's container 10 generally near the open upper end 12 of the grower's container 10. The area bonding material 74 around the opening 72 on the sheet of material 60 bondingly engages and connects the adjacent portion of the outer peripheral surface 20 of the grower's container 10. The sheet of material 60 may engage the outer peripheral surface 20 of the grower's container 10 during the mere action of pulling or pushing the grower's container 10 through the opening 72, or the sheet of material 60 may be manually or automatically pressed against the outer peripheral surface 20 to cause the area of bonding material 74 to engage the outer peripheral surface 20 of the grower's container 10. The decorative collar 62 extends upwardly and outwardly from the open upper end 12 of the grower's container 10. The stickers 50 can then be disposed over the drain hole 40 of the grower's container 10 in the manner previously described.

It will be understood that the sticker 50 may be disposed over the drain hole 40c or 40d prior to or after any of the steps in the several methods described herein. The sticker 50 may also be removed from over the drain hole 40c or 40d prior to or after any of the steps in the several methods described herein.

For the sake of brevity, the drain hole 40c described hereinbefore is only discussed in relation to the grower's container 10c. However, it will be understood that any embodiments of the decorative grower's container 10 contained herein, including the decorative grower's containers 10, 10a and 10b, can be provided with the drain hole 40c.

For the sake of brevity, the sticker 50 described hereinbefore is only discussed in relation to the grower's container 10 and 10c. However, it will be understood that any embodiments of the decorative grower's container contained herein, including the decorative grower's containers 10a and 10b, can be provided with a sticker 50.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method for growing a plant in a decorative grower's container having an aesthetically pleasing appearance such that the decorative grower's container is not covered with a decorative cover or sleeve to hide the decorative grower's container and the grown plant is not transplanted into a second container when the grown plant contained in the decorative grower's container is on display, and wherein the decorative grower's container having the plant grown therein may be shipped from a grower's location to wholesale or retail distribution points for sale of the plant in the decorative grower's container, the method comprising the steps of:

providing at least one sticker with a bonding material thereon;

providing a decorative grower's container to a grower of plants at a grower's location, the decorative grower's container having an open upper end, a closed lower end, at least one drain hole, a sidewall having an outer peripheral surface, the sidewall and the closed lower end cooperating to define a floral grouping retaining space in open communication with the open upper end of the decorative grower's container and a decorative printed pattern disposed on at least a portion of the outer peripheral surface of the sidewall of the decorative grower's container;

applying at least one sticker over at least one drain hole in the decorative grower's container so as to seal at least one drain hole;

disposing a growing medium and a floral grouping in the floral grouping retaining space of the decorative grower's container;

feeding and watering the floral grouping growing in the decorative grower's container;

cleaning at least a portion of the outer peripheral surface of the sidewall of the decorative grower's container so that the decorative printed pattern on at least a portion of the outer peripheral surface of the sidewall of the decorative grower's container is visible when the matured floral grouping contained in the decorative grower's container is on display, thereby providing a decorative container having an aesthetically pleasing appearance and a controllable rate of drainage;

providing a sheet of material having an opening therein;

disposing the decorative grower's container into the opening in the sheet of material and forming the sheet of material into a decorative collar about the decorative grower's container; and shipping the decorative grower's container containing the floral grouping to a distributor at wholesale or retail distribution points so that the decorative printed pattern on a portion of the outer peripheral surface of the sidewall of the decorative grower's container provides the aesthetically pleasing appearance to the decorative grower's container when the matured floral grouping contained in the decorative grower's container is on display at wholesale or retail distribution points, and wherein the aesthetically pleasing appearance is provided without the use of a decorative flower pot cover or sleeve and without transplanting the plant into a second container.

2. The method of claim 1 wherein, in the step of providing a decorative grower's container, at least one drain hole in the decorative grower's container is located in the sidewall of the decorative grower's container for providing irrigation and drainage to the growing medium and the floral grouping retaining space of the decorative grower's container.

3. The method of claim 1 wherein, in the step of providing a decorative grower's container, at least one drain hole in the decorative grower's container is located in the closed lower end of the decorative grower's container for providing irrigation and drainage to the growing medium and the floral grouping retaining space of the decorative grower's container.

4. The method of claim 1 wherein, in the step of providing a decorative grower's container, at least one drain hole in the decorative grower's container is located in the closed lower end of the decorative grower's container and at least one drain hole is located in the side wall of the decorative grower's container, for providing irrigation and drainage to the growing medium and the floral grouping retaining space of the decorative grower's container.

5. The method of claim 1 wherein, in the step of providing a decorative grower's container, the decorative grower's container is constructed of a material selected from the group consisting of polymeric material, sandstone, clay, ceramics, porcelain, plaster, marble and glass.

6. The method of claim 1 further comprising the step of applying a decorative embossed pattern to at least a portion of the outer peripheral surface of the sidewall of the decorative grower's container, wherein the decorative embossed pattern cooperates with the decorative printed pattern to provide the decorative grower's container with an aesthetically pleasing appearance.

7. The method of claim 6 wherein the decorative embossed pattern and the decorative printed pattern are in register with one another.

8. The method of claim 6 wherein the decorative embossed pattern and the decorative printed pattern are out of register with one another.

9. The method of claim 6 wherein the decorative embossed pattern and the decorative printed pattern are partially in register with one another and partially out of register with one another.

10. A method for growing a plant in a decorative grower's container having an aesthetically pleasing appearance such that the decorative grower's container is not covered with a decorative cover or sleeve to hide the decorative growers container and the grown plant is not transplanted when the grown plant contained in the decorative grower's container is on display, and wherein the decorative grower's container having the plant grown therein may be shipped from a grower's location to wholesale or retail distribution points for sale of the plant in the decorative grower's container, the method comprising the steps of:

providing at least one rubber stopper;

providing a decorative grower's container to a grower of plants at a grower's location, the decorative grower's container having an open upper end, a closed lower end, a sidewall having an outer peripheral surface and at least one drain hole therethrough, the sidewall and the dosed lower end cooperating to define a floral grouping retaining space in open communication with the open upper end of the decorative grower's container and a decorative printed pattern disposed on at least a portion of the outer peripheral surface of the sidewall of the decorative grower's container;

disposing at least one rubber stopper into the drain bole in the side wall of the decorative grower's container so as to seal the drain hole;

disposing a growing medium and a floral grouping in the floral grouping retaining space of the decorative grower's container;

feeding and watering the floral grouping growing in the decorative grower's container;

cleaning at least a portion of the outer peripheral surface of the sidewall of the decorative grower's container so that the decorative printed pattern on at least a portion of the outer peripheral surface of the sidewall of the decorative grower's container is visible when the matured floral grouping contained in the decorative grower's container is on display, thereby providing a decorative container having an aesthetically pleasing appearance and a controllable rate of drainage;

providing a sheet of material having an opening therein;

disposing the decorative grower's container into the opening in the sheet of material and forming the sheet of material into a decorative collar about the decorative grower's container; and shipping the decorative grower's container containing the floral grouping to a distributor at wholesale or retail distribution points so that the decorative printed pattern on a portion of the outer peripheral surface of the sidewall of the decorative grower's container provides the aesthetically pleasing appearance to the decorative grower's container when the matured floral grouping contained in the decorative grower's container is on display at wholesale or retail distribution points, and wherein the aesthetically pleasing appearance is provided without the use of a decorative flower pot cover or sleeve and without transplanting the plant into a second container.

11. The method of claim 10 wherein, in the step of providing a decorative grower's container, the decorative grower's container is constructed of a material selected from the group consisting of polymeric material, sandstone, clay, ceramics, porcelain, plaster, marble and glass.

12. The method of claim 10 further comprising the step of applying a decorative embossed pattern to at least a portion of the outer peripheral surface of the sidewall of the decorative grower's container, wherein the decorative embossed pattern cooperates with the decorative printed pattern to provide the decorative grower's container with an aesthetically pleasing appearance.

13. The method of claim 12 wherein the decorative embossed pattern and the decorative printed pattern are in register with one another.

14. The method of claim 12 wherein the decorative embossed pattern and the decorative printed pattern are out of register with one another.

15. The method of claim 12 wherein the decorative embossed pattern and the decorative printed pattern are partially in register with one another and partially out of register with one another.

16. A method for growing a plant in a decorative grower's container having an aesthetically pleasing appearance such that the decorative grower's container is not covered with a decorative cover or sleeve to hide the decorative grower's container and the grown plant is not transplanted into a second container when the grown plant contained in the decorative grower's container is on display, and wherein the decorative grower's container having the plant grown therein may be shipped from a grower's location to wholesale or retail distribution points for sale of the plant in the decorative grower's container, the method comprising the steps of:

providing at least one sticker with a bonding material thereon;

providing a decorative grower's container to a grower of plants at a grower's location, the decorative grower's container having an open upper end, a closed lower end, at least one drain hole, a sidewall having an outer peripheral surface, the sidewall and the closed lower end cooperating to define a floral grouping retaining space in open communication with the open upper end of the decorative grower's container and a decorative printed pattern disposed on at least a portion of the outer peripheral surface of the sidewall of the decorative grower's container;

applying at least one sticker over at least one drain hole in the decorative grower's container so as to seal at least one drain hole;

disposing a growing medium and a floral grouping in the floral grouping retaining space of the decorative grower's container;

feeding and watering the floral grouping growing in the decorative grower's container;

cleaning at least a portion of the outer peripheral surface of the sidewall of the decorative grower's container so that the decorative printed pattern on at least a portion of the outer peripheral surface of the sidewall of the decorative grower's container is visible when the matured floral grouping contained in the decorative grower's container is on display, thereby providing a decorative container having an aesthetically pleasing appearance and a controllable rate of drainage;

shipping the decorative grower's container containing the floral grouping to a distributor at wholesale or retail distribution points so that the decorative printed pattern on a portion of the outer peripheral surface of the sidewall of the decorative grower's container provides the aesthetically pleasing appearance to the decorative grower's container when the matured floral grouping contained in the decorative grower's container is on display at wholesale or retail distribution points, and wherein the aesthetically pleasing appearance is provided without the use of a decorative flower pot cover or sleeve and without transplanting the plant into a second container;

providing a sheet of material having an opening therein; and disposing the decorative grower's container into the opening in the sheet of material and forming the sheet of material into a decorative collar about the decorative grower's container.

17. The method of claim 16 wherein, in the step of providing a decorative grower's container, at least one drain hole in the decorative grower's container is located in the sidewall of the decorative grower's container for providing irrigation and drainage to the growing medium and the floral grouping retaining space of the decorative grower's container.

18. The method of claim 16 wherein, in the step of providing a decorative grower's container, at least one drain hole in the decorative grower's container is located in the closed lower end of the decorative grower's container for providing irrigation and drainage to the growing medium and the floral grouping retaining space of the decorative grower's container.

19. The method of claim 16 wherein, in the step of providing a decorative grower's container, at least one drain hole in the decorative grower's container is located in the closed lower end of the decorative grower's container and at least one drain hole is located in the side wall of the decorative grower's container, for providing irrigation and drainage to the growing medium and the floral grouping retaining space of the decorative grower's container.

20. The method of claim 16 wherein, in the step of providing a decorative grower's container, the decorative grower's container is constructed of a material selected from the group consisting of polymeric material, sandstone, clay, ceramics, porcelain, plaster, marble and glass.

21. The method of claim 16 further comprising the step of applying a decorative embossed pattern to at least a portion of the outer peripheral surface of the sidewall of the decorative grower's container, wherein the decorative embossed pattern cooperates with the decorative printed pattern to provide the decorative grower's container with an aesthetically pleasing appearance.

22. The method of claim 21 wherein the decorative embossed pattern and the decorative printed pattern are in register with one another.

23. The method of claim 21 wherein the decorative embossed pattern and the decorative printed pattern are out of register with one another.

24. The method of claim 21 wherein the decorative embossed pattern and the decorative printed pattern are partially in register with one another and partially out of register with one another.

25. A method for growing a plant in a decorative grower's container having an aesthetically pleasing appearance such that the decorative grower's container is not covered with a decorative cover or sleeve to hide the decorative grower's container and the grown plant is not transplanted when the grown plant contained in the decorative grower's container is on display, and wherein the decorative grower's container having the plant grown therein may be shipped from a grower's location to wholesale or retail distribution points for sale of the plant in the decorative grower's container, the method comprising the steps of:

providing at least one rubber stopper;

providing a decorative grower's container to a grower of plants at a grower's location, the decorative grower's container having an open upper end, a closed lower end, a sidewall having an outer peripheral surface and at least one drain hole therethrough, the sidewall and the closed lower end cooperating to define a floral grouping retaining space in open communication with the open upper end of the decorative grower's container and a decorative printed pattern disposed on at least a portion of the outer peripheral surface of the sidewall of the decorative grower's container;

disposing at least one rubber stopper into the drain hole in the side wall of the decorative grower's container so as to seal the drain hole;

disposing a growing medium and a floral grouping in the floral grouping retaining space of the decorative grower's container;

feeding and watering the floral grouping growing in the decorative grower's container;

cleaning at least a portion of the outer peripheral surface of the sidewall of the decorative grower's container so that the decorative printed pattern on at least a portion of the outer peripheral surface of the sidewall of the decorative grower's container is visible when the matured floral grouping contained in the decorative growers container is on display, thereby providing a decorative container having an aesthetically pleasing appearance and a controllable rate of drainage;

shipping the decorative grower's container containing the floral grouping to a distributor at wholesale or retail distribution points so that the decorative printed pattern on a portion of the outer peripheral surface of the sidewall of the decorative grower's container provides the aesthetically pleasing appearance to the decorative grower's container when the matured floral grouping contained in the decorative grower's container is on display at wholesale or retail distribution points, and wherein the aesthetically pleasing appearance is provided without the use of a decorative flower pot cover or sleeve and without transplanting the plant into a second container;

providing a sheet of material having an opening therein; and disposing the decorative grower's container into the opening in the sheet of material and forming the sheet of material into a decorative collar about the decorative grower's container.

26. The method of claim 25 wherein, in the step of providing a decorative growers container, the decorative grower's container is constructed of a material selected from the group consisting of polymeric material, sandstone, clay, ceramics, porcelain, plaster, marble and glass.

27. The method of claim 25 further comprising the step of applying a decorative embossed pattern to at least a portion of the outer peripheral surface of the sidewall of the decorative grower's container, wherein the decorative embossed pattern cooperates with the decorative printed pattern to provide the decorative grower's container with an aesthetically pleasing appearance.

28. The method of claim 25 wherein the decorative embossed pattern and the decorative printed pattern are in register with one another.

29. The method of claim 25 wherein the decorative embossed pattern and the decorative printed pattern are out of register with one another.

30. The method of claim 25 wherein the decorative embossed pattern and the decorative printed pattern are partially in register with one another and partially out of register with one another.

* * * * *

UNITED STATES PATENT AND TRADEMARK OFFICE
CERTIFICATE OF CORRECTION

PATENT NO. : 6,625,928 B2
DATED : October 6, 2004
INVENTOR(S) : Donald E. Weder It is certified that error appears in the above-identified patent and that said Letters Patent is hereby corrected as shown below:

Column 11,
Line 44, delete "bole" and replace with word -- hole --.

Signed and Sealed this

Ninth Day of November, 2004

JON W. DUDAS
*Director of the United States Patent and Trademark Office*